United States Patent Office 3,767,650
Patented Oct. 23, 1973

3,767,650
3-AMINO-2-ARYL-ACROLEINS
Goetz E. Hardtmann, Florham Park, N.J., assignor to Sandoz-Wander, Inc., Hanover, N.J.
No Drawing. Continuation-in-part of abandoned application Ser. No. 27,460, Apr. 10, 1970. This application Nov. 9, 1970, Ser. No. 88,221
Int. Cl. C07c 95/08
U.S. Cl. 260—240 D
6 Claims

ABSTRACT OF THE DISCLOSURE

The present invention discloses compounds of the class of 3-amino-2-aryl-acroleins, e.g. 3-dimethylamino-2-(3,4-dimethoxyphenyl)-acrolein. The compounds are useful as pharmaceutical agents, e.g. as anti-inflammatory agents, and may be prepared by reacting an arylacetic acid with an appropriately disubstituted formamide by the Vilsmeier reaction.

---

This application is a continuation-in-part of application Ser. No. 27,460, filed Apr. 10, 1970, now abandoned.

The present invention relates to compounds which are derivatives of acrolein, and more particularly to compounds which are 3-amino-2-aryl-acroleins. The invention also relates to pharmaceutical methods and composition utilizing said compounds.

The compounds of the present invention may be represented by the structural Formula I:

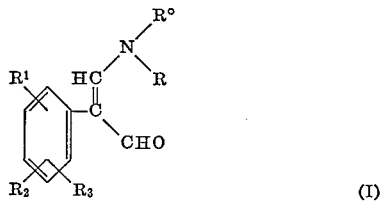

(I)

wherein each of $R_1$ and $R_2$ is independently halo of atomic weight of from 18 to 36, lower alkyl of 1 to 3 carbon atoms or lower alkoxy of 1 to 3 carbon atoms, or together are methylenedioxy (on adjacent ring positions, e.g. 3,4-methylenedioxy);

$R_3$ is hydrogen or lower alkoxy of 1 to 3 carbon atoms, provided that $R_3$ is hydrogen when either of $R_1$ and $R_2$ is other than alkoxy;

$R°$ is lower alkyl of 1 or 2 carbon atoms; and

R is lower alkyl of 1 or 2 carbon atoms or phenyl; or $R°$ and R together with the nitrogen to which they are attached form a saturated heterocyclic ring having 5 to 7 ring atoms of which one is a nitrogen atom and the balance are carbon atoms, e.g. N-pyrrolidyl and N-piperidyl.

The compounds of Formula I are preferably prepared employing the Vilsmeier reaction by reacting a compound of the Formula II:

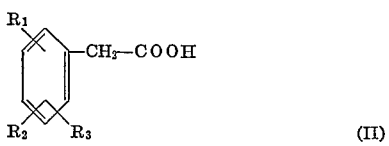

(II)

wherein $R_1$, $R_2$ and $R_3$ are as defined, with the disubstituted formamide reaction product obtained on reacting a compound of the Formula III

(III)

wherein $R°$ and R are as defined, with a phosphorus oxyhalide, i.e. phosphorus oxychloride or phosphorus oxybromide.

Such preparation of the compounds I is suitably carried out at elevated temperatures in the range of from 30° C. to 120° C., preferably 50° C. to 100° C., and preferably in the presence of an inert organic solvent which may be any of several conventional type organic solvents but which conveniently may be in whole or in part the formamide reacted with the phosphorus oxyhalide to obtain the disubstituted formamide reaction product. Thus, preferred solvents include dimethylformamide, diethylformamide and the like depending upon the particular compound of Formula I being prepared. The reaction product of Formula I may be recovered by working up of the reaction mixture in a conventional manner.

The preparation of the disubstituted formamide reaction product is carried out in a conventional manner by reacting approximately equimolar amounts of the compound III and the phosphorus oxyhalide, preferably phosphorus oxychloride, at temperatures in the range of from 0° C. to 35° C., preferably 10° C. to 30° C.

The compounds of Formulae II and III employed in the preparation of compounds I are either known per se or may be prepared from known materials by established procedures.

The compounds of Formula I are useful because they possess pharmacological activity in animals. In particular, the compounds I are useful as anti-inflammatory agents as indicated by the adjuvant arthritis test in rats using Mycobacteria butyricum in Freund's adjuvant. For such use, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. The dosage administered will, of course, vary depending upon the compounds used and the mode of administration. However, in general, satisfactory results are obtained when administered at a daily dosage of from about 0.15 milligram to about 100 milligrams per kilogram of body weight, preferably given in divided doses 2 to 4 times a day, or in sustained release form. For most mammals the administration of from about 10 milligrams to about 1000 milligrams of the compound per day provides satisfactory results and dosage forms suitable for internal administration comprise from about 2.5 milligrams to about 500 milligrams of the compound in admixture with a solid or liquid pharmaceutical carrier or diluent.

For the above usage, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactone and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules preferably contain the active ingredient admixed with an inert solid diluent, e.g., calcium carbonate, calcium phosphate and kaolin. The preferred pharmaceutical compositions from the standpoint of preparation and ease of administration are solid compositions, particularly solid diluent-filled capsules and tablets.

A representative formulation is a tablet prepared by conventional tabletting techniques and containing the following ingredients.

| Ingredient: | Weight (mg.) |
|---|---|
| 3-dimethylamino - 2 - (3,4-dimethoxyphenyl)-acrolein | 50 |
| Tragacanth | 10 |
| Lactose | 197.5 |
| Corn starch | 25 |
| Talcum | 15 |
| Magnesium stearate | 2.5 |

The following examples show representative compounds encompassed within the scope of this invention and the manner in which such compounds are prepared. However, it is to be understood that the examples are for purposes of illustration only.

EXAMPLE 1

3-dimethylamino-2-(3,4-dimethoxyphenyl)-acrolein

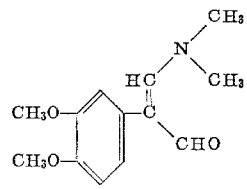

To 350 ml. of phosphorus oxychloride is added dropwise 200 ml. of dimethylformamide while maintaining cooling with an ice-bath (reaction temperature 15–25° C.). To the resulting mixture is added a solution of 150 g. of 3,4-dimethoxyphenylacetic acid in 500 ml. of dimethylformamide and the resulting mixture heated at 70° C. for 15 hours. The resulting reaction mixture is cooled, poured onto 3 kg. of ice, made neutral with powdered potassium carbonate and then brought to pH 13 with 50% aqueous sodium hydroxide solution. The resulting mixture is then heated on a steam bath for one half hour, diluted with 2 liters of water and extracted three times with chloroform. The combined organic phase dried and evaporated in vacuo. The residue is crystallized from chloroform/pentane to obtain 3-dimethylamino-2-(3,4-dimethoxyphenyl)-acrolein, M.P. 130–132° C.

EXAMPLE 2

Following the procedure of Example 1 the following are prepared:

(a) 3-dimethylamino-2-(3,4,5-trimethoxyphenyl)-acrolein, M.P. 99–103° C.
(b) 3-dimethylamino-2-(3,4-dichlorophenyl)-acrolein.
(c) 3-N-piperidyl-2-(3,4-dimethoxyphenyl)-acrolein.

What is claimed is:

1. A compound of the formula

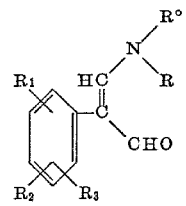

wherein
each of $R_1$ and $R_2$ is lower alkoxy;
$R_3$ is hydrogen or lower alkoxy;
$R°$ is lower alkyl; and
R is lower alkyl; or
$R°$ and R together with the nitrogen to which they are attached form a saturated heterocyclic ring having 5 to 7 ring atoms of which one is the nitrogen atom and the balance are carbon atoms.

2. A compound of claim 1 in which each of $R°$ and R is lower alkyl.

3. A compound of claim 2 in which each of $R°$ and R is methyl.

4. The compound of claim 3 which is 3-dimethylamino-2-(3,4-dimethoxyphenyl)-acrolein.

5. The compound of claim 3 which is 3-dimethylamino-2-(2,3,4-trimethoxyphenyl)-acrolein.

6. The compound of claim 1 which is 3-N-piperidyl-2-(3,4-dimethoxyphenyl)-acrolein.

References Cited

UNITED STATES PATENTS 3,502,673   3/1970   Hepworth et al. _____ 260—251

FOREIGN PATENTS 1,121,922   7/1968   England _____ 260—251

OTHER REFERENCES

Chemical Abstracts, vol. 51, col. 13761 (1957) (abstract of Arnold et al.).

Chemical Abstracts, vol. 56, cols. 15328–9 (1962) (abstract of Arnold).

JOHN D. RANDOLPH, Primary Examiner

U.S. Cl. X.R.

260—570.5 C; 424—244, 267, 274, 330